D. T. PHILLIPS.
CORN HARVESTING MACHINE.
APPLICATION FILED JULY 15, 1912.
1,115,565.
Patented Nov. 3, 1914.
5 SHEETS—SHEET 4.
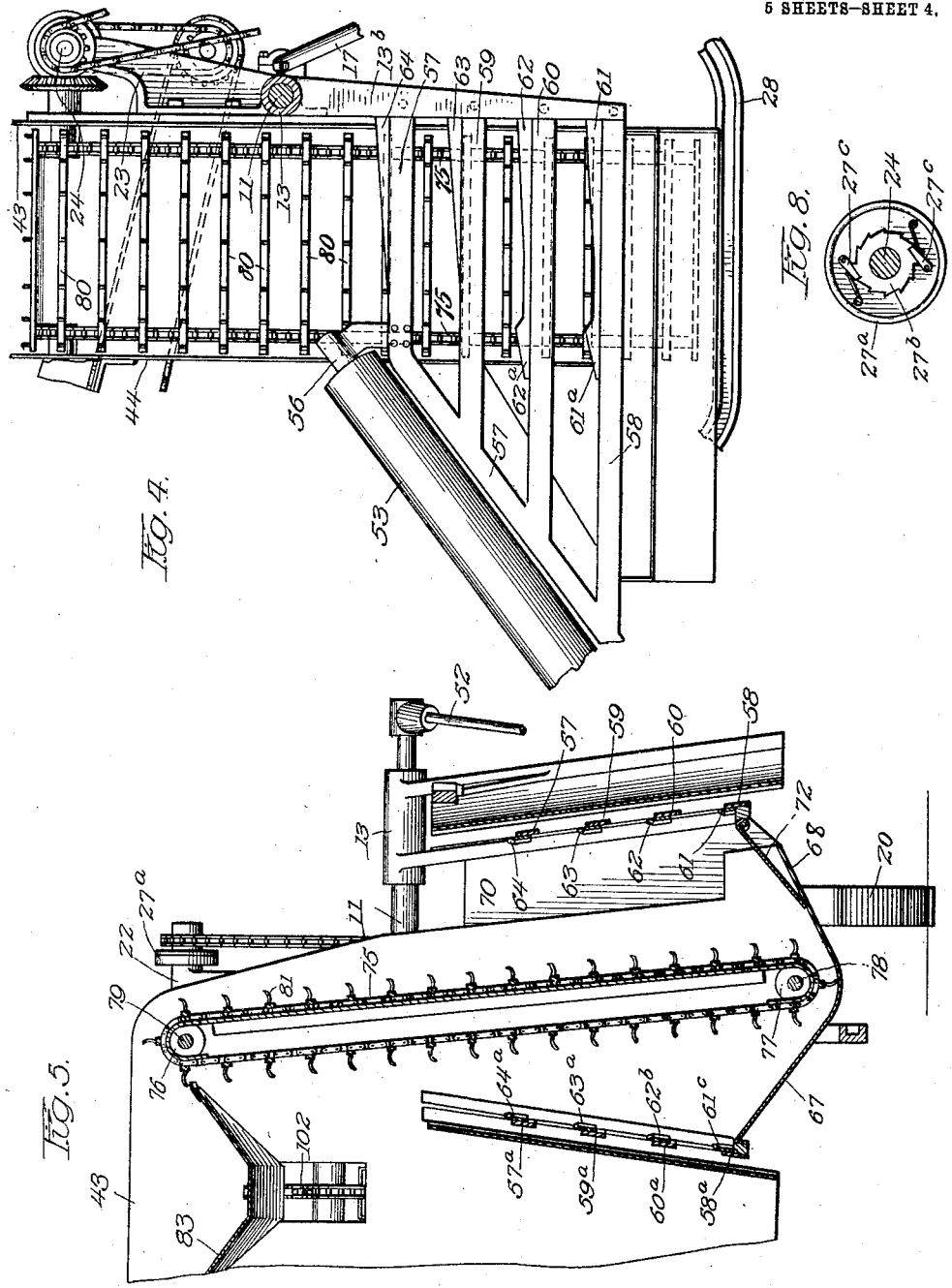

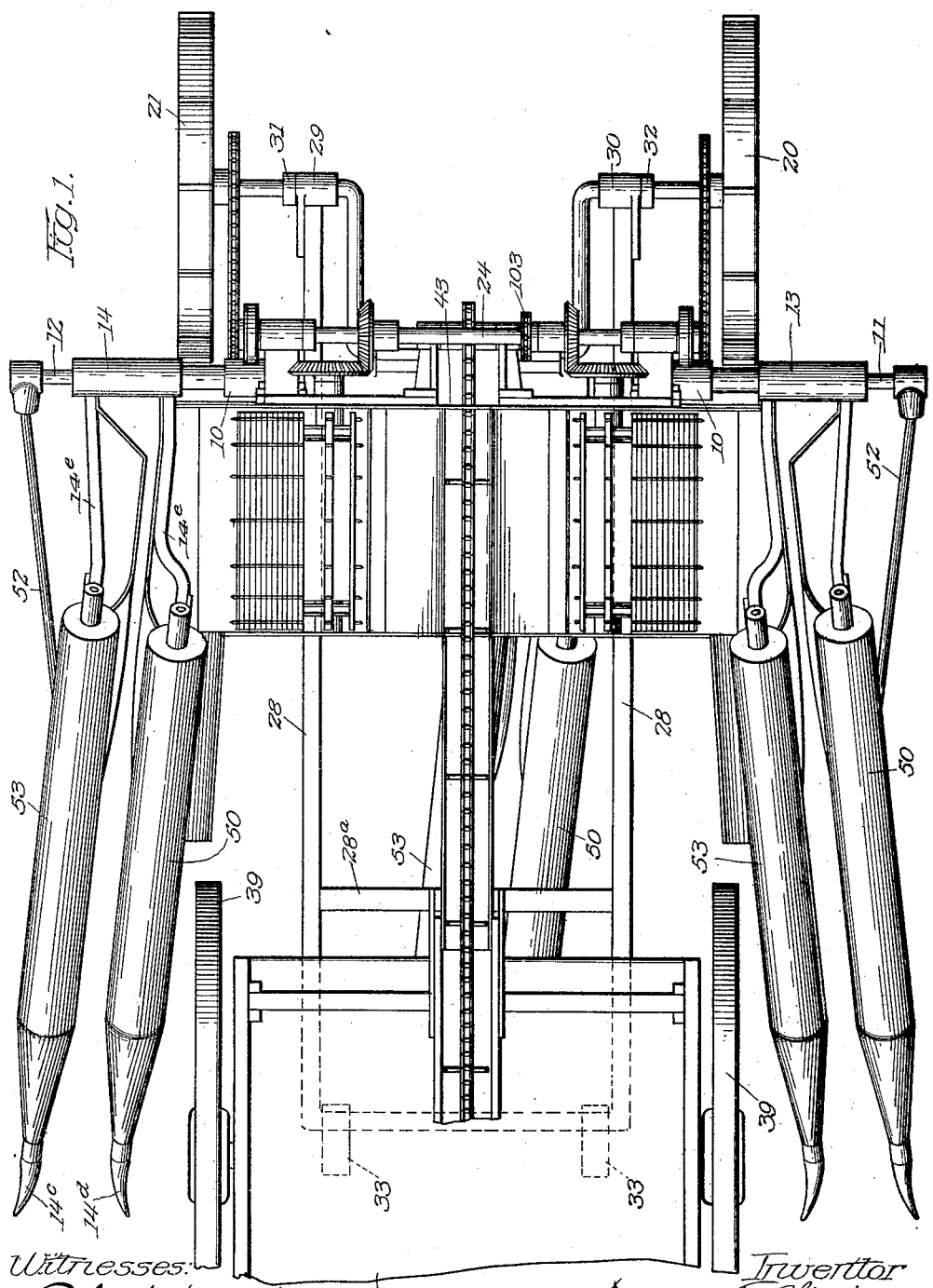

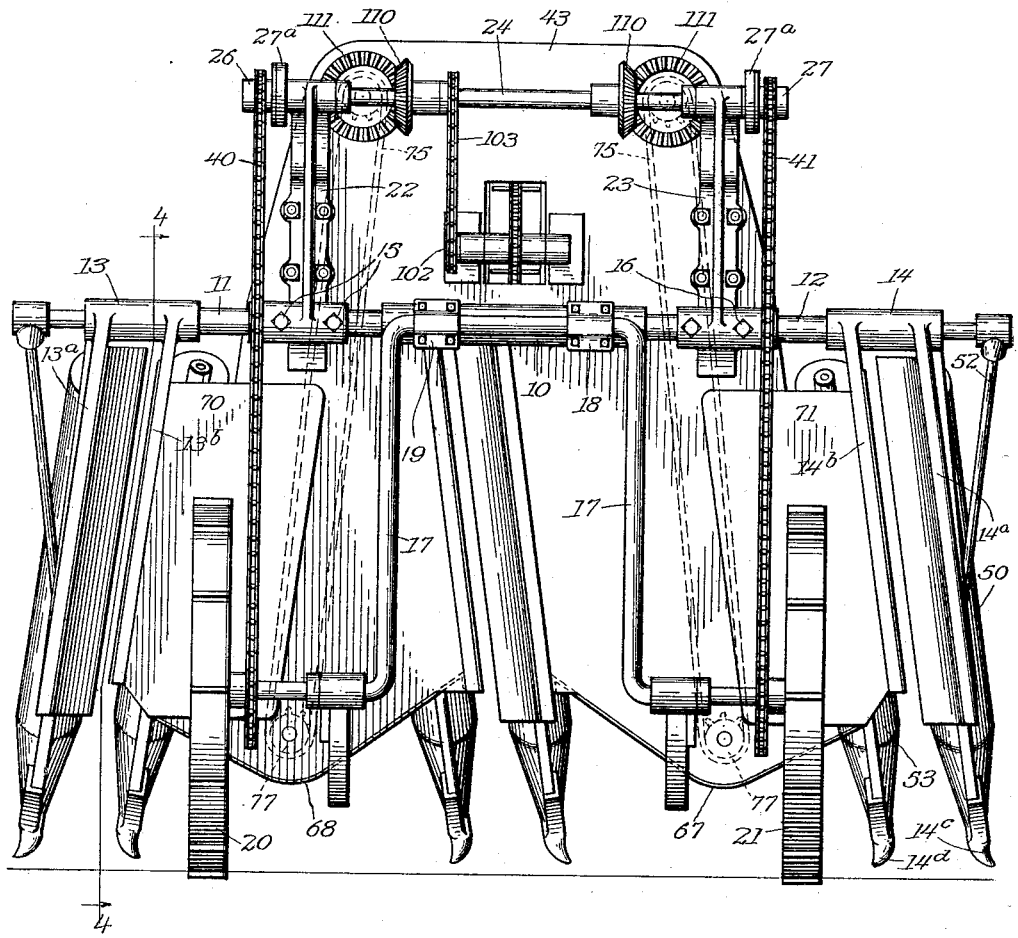

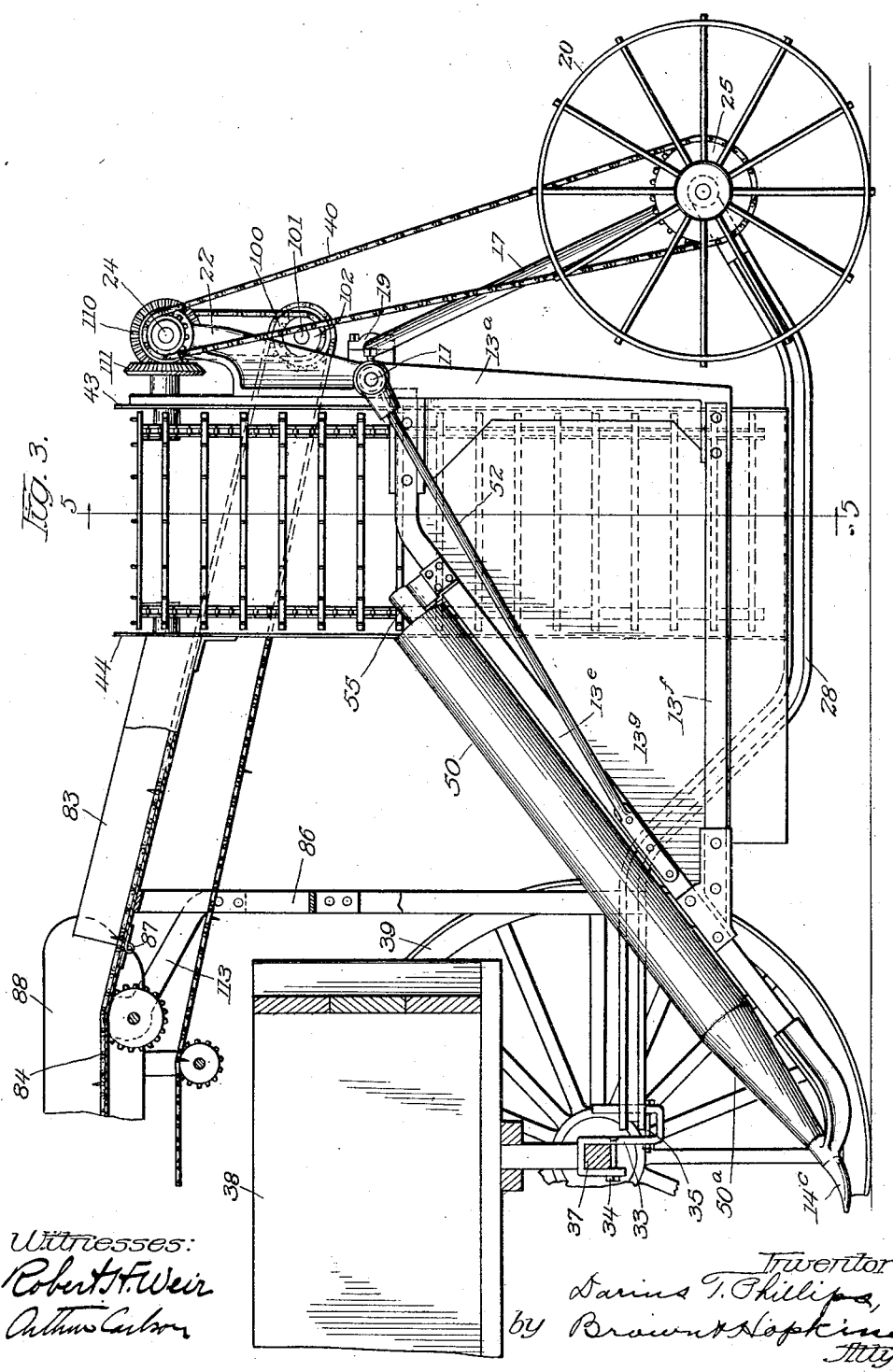

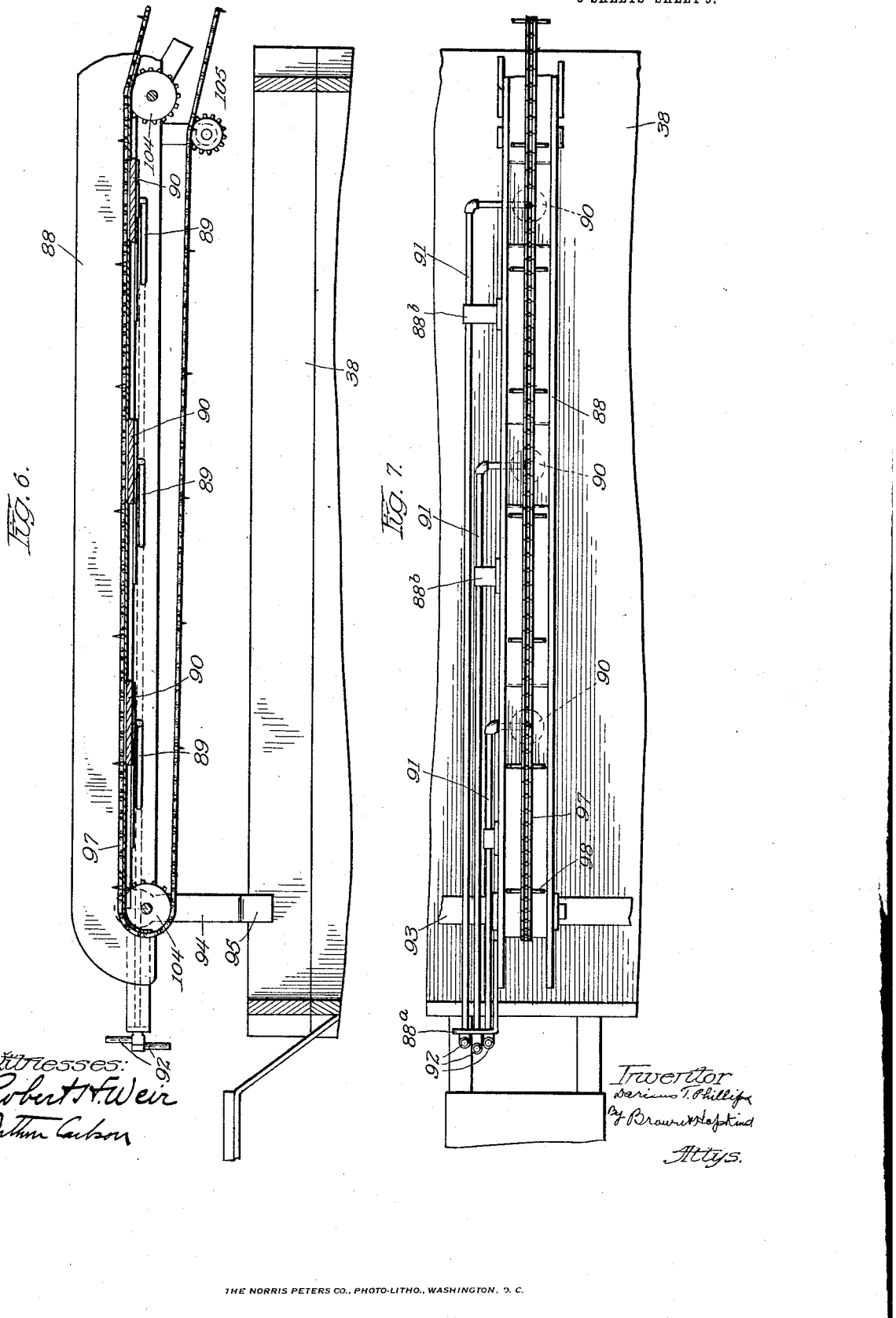

UNITED STATES PATENT OFFICE.

DARIUS T. PHILLIPS, OF CHICAGO, ILLINOIS.

CORN-HARVESTING MACHINE.

1,115,565.  Specification of Letters Patent.  Patented Nov. 3, 1914.

Application filed July 15, 1912. Serial No. 709,615.

*To all whom it may concern:*

Be it known that I, DARIUS T. PHILLIPS, a citizen of the United States, residing at Chicago, in the county of Cook and State of Illinois, have invented certain new and useful Improvements in Corn - Harvesting Machines, of which the following is a specification.

The invention relates to improvements in machines for harvesting corn from the standing stalks and is of the general type of machine adapted to harvest or gather the ears of corn from one or more rows of the common field Indian corn or maize.

The object of the invention is to generally improve the details of construction of corn harvesting machines and to produce a machine that is simple in construction and efficient in operation to gather particularly the unhusked ears into the machine, where the husks may or may not subsequently be removed prior to delivering them to a wagon or other conveyance or receptacle, or the husking feature of the machine may be omitted, as in the present embodiment of the invention shown in the drawings and described in the specification.

A further object of the invention is to produce a corn harvesting machine with improved gathering devices operative without the employment of the usual power draft gathering or snapping rolls.

A further object of the invention is to produce improved ear picking or gathering devices in a machine of the class described.

A further object of the invention resides in the provision of improved means for varying the width of the gathering units, of which it is preferred that a plurality be used, there being three of these units so adapted to gather simultaneously three rows of corn in the embodiment of the invention shown, although it will be obvious that the machine may be constructed to gather any convenient number of rows more than one.

In the embodiment of the invention shown the harvesting machine is attached and drawn by a wagon or other farm vehicle which serves as a receptacle for the gathered corn, and it is one of the objects of this invention to provide an improved machine of the class described of a character that may be thus operated without the use of additional draft power or operators other than the teams or other power and operators required in operating the wagon.

A further object of the invention resides in the provision of an improved carrying means adapted to deliver the gathered ears from the harvester into the wagon box by which the harvester is drawn, the said carrier being adapted to deliver the corn throughout the longitudinal length of the wagon box or other receptacle into which the gathered corn is to be delivered.

Other objects of the invention will appear from the following description of the invention relating to the preferred embodiment thereof, as shown in the drawings, which form a part of the specification.

In the said drawings: Figure 1 is a top plan view of the preferred form of my harvester, shown attached to the rear end of a farm wagon, the corn delivering carrier shown extending over the top of the wagon box, a part of both wagon box and carrier being broken away in this view. Fig. 2 is a rear elevation of the harvester. Fig. 3 is a side elevation of the harvester, showing the manner of its attachment to the wagon, part of the carrier of the harvester being broken away. In this view a part of the wagon is also broken away, the wagon being shown in section. Fig. 4 is a side elevation of one of the elevators of which there are two in a three row machine of the embodiment shown. In this view adjacent parts of the machine are broken away to disclose the details of construction of the elevators and of the adjacent stalk rolls and ear gathering devices. Broken parts of the mechanism for driving the elevator mechanism are also shown in detail in this view, the section being taken approximately on line 4—4 of Fig. 2. Fig. 5 is a view similar to Fig. 4, being in section and taken approximately on line 5—5 of Fig. 3, looking in the direction indicated by the arrows. Figs. 6 and 7 are elevation and plan views respectively of the harvester carrier shown in its extended position above the top of the wagon box, broken parts of the wagon box being shown and also the sliding connection for upwardly supporting the forward end of the carrier on the longitudinal sides of the wagon box. Fig. 8 is a detail showing the construction of one of the ratchets on the main driving shaft which is journaled near the top of the harvester main frame.

In constructing my improved corn harvester the various operating parts may be supported by a main frame admitting of the usual variations in structure, but I prefer to employ substantially the form of supporting frame herein shown and described, consisting of certain telescoping parts supported upon suitable carrying wheels adapted to sustain the ear gathering devices and the mechanism for receiving, elevating and delivering the harvested corn to the wagon or the receiving receptacle. The tubular supporting member 10 furnishes on the interior thereof a sliding support for the two shafts 11, 12, which extend laterally and which carry near their outer extremities frames 13, 14, which serve to support the ear gathering mechanism for the two outside rows of corn. The gathering frames 13, 14 are preferably rigidly secured to the shafts 11, 12, but the shafts 11, 12 themselves are slidingly mounted, so that they telescope on the interior of the frame member 10 and are adjustably secured therein by suitable means, as the set screws 15, 16. In this embodiment of the invention tubular frame member 10 is shown circular in cross section and the shafts 11, 12 likewise are shown round or circular in cross section, this, of course, necessitates the use of set screws 15, 16, to prevent sliding or relative turning movement. By loosening said screws 15, 16 it will be apparent that the harvesting or ear gathering units carried by frames 13, 14 may be adjusted longitudinally on the frame member 10 to increase or decrease the distance between them, or, in other words, to adapt the machine to gather corn in which the rows may be planted varying distances apart. The tubular frame member 10, which carries the important parts of the machine is supported by an axle member of irregular formation, which is generally designated by the reference character 17. This member is preferably made of a solid piece of steel shafting of uniform diameter of about one and a quarter inch stock, and is given an inverted U shape to extend over the middle row of corn being harvested. The upper extremity of the U shaped member 17 is adapted to engage the tubular frame member 10, to which it is secured in a suitable manner for supporting same, as by clamps 18, 19 and ordinary bolts, as illustrated. The member 17, having the two downwardly extending branches which are curved outwardly, parallel with the ground and parallel with the main frame member 10, provides axles for the carrying and driving wheels 20, 21, which not only carry the principal weight of the machine, but also are preferably utilized for furnishing power for driving the operative parts of the machine. The tubular frame member 10 has secured to it two uprights 22, 23, which serve to support a horizontal shaft 24, extending approximately parallel with the tubular frame member 10, and some distance above it.

On the hubs of the carrying and driving wheels 20, 21 driving sprockets, as indicated at 25, Fig. 3, are provided. Suitable chains or endless belts pass over these sprockets and engage sprockets at 26, 27 on the extremities of shaft 24 at the top of the machine. In order to provide for discrepancies in the degree of the movement of the two driving wheels 20, 21 I prefer to connect the driving sprockets 26, 27 with shaft 24 by suitable ratchets, which are operative to turn the shaft in one direction and inoperative when the movements of the sprockets 26, 27 take place in the opposite direction. Any form of ratchet mechanism may be employed, and one form is shown in detail in Fig. 8, in which 27$^a$ is the casing of the ratchet, 27$^b$ a ratchet wheel secured to shaft 24 and 27$^c$ spring pressed pawls pivotally secured to the casing 27$^a$ and engaging the teeth on ratchets 27$^b$. The various operative parts of the machine are driven from shaft 24.

By referring particularly to Fig. 1, it will be seen that a bottom supporting frame is provided, the same being designated generally by the reference character 28. This frame is substantially of a U shape, with the branches extending rearwardly and connected to the axle portions of the U shaped axle member 17. This connection may be made in any desired manner, that preferred being, as illustrated, by enlarging the rearmost extremities of the frame members, as indicated at 29, 30, or attaching suitable bearing castings thereto for insertion over the axles. When inserted in position with the axle this frame may be retained in permanent relation thereto by suitable collars, as indicated at 31, 32, or other suitable means. The frame member 28 extends beneath the entire machine and some distance forwardly, in order to provide suitable means for attaching the machine to the wagon or other vehicle, to which the machine is adapted to be attached, and to which it is preferable to be operated.

By referring to Fig. 3, the general form of the frame 28 will be seen, from which it will be observed that it is deflected upwardly somewhat for a portion of its length forward of the axles, and thence extends upwardly in front of the elevators and harvester to a point adjacent the rear axle of the wagon, or the wagon reach, to which it is secured by any suitable means that will permit it to have a certain amount of vertical movement in relation to the wagon, but at the same time cause it to be drawn by the wagon. The manner in which I prefer to accomplish this is illustrated in Fig. 3 in particular. 33 is a clamp fixed to the rear axle, as by bolt 34, and being provided with a branch that extends rearwardly and vertically into which the forward part of the U shaped main frame engages. Two of these members 33 are preferably employed and these are preferably so secured to the axle or reach of the wagon as to coöperate with the forward end of the frame 28 to prevent lateral movement of the same, but at the same time to permit the frame of the machine to have a certain amount of vertical movement or play in relation to the axle or reach of the wagon. To fix the opposite extent of downward movement in order to prevent the points of the harvester from engaging in the ground the bottom of the U shaped member 33 is made adjustable by the insertion of suitable bolts, as indicated at 35, there being a plurality of holes in the U shaped member into which the bolts 35 may be inserted to meet various requirements and conditions. The frame 28 may be strengthened by various braces, as indicated, for example at 28$^a$, of which there may be one or more so placed as simply to strengthen the frame, or to assist in supporting various parts of the machine in relation to this frame.

In the embodiment of the invention it is shown attached to a wagon, the rear axle of which is designated for convenience by the reference character 37, the wagon box by 38, and the rear wheels by the reference character 39.

The reference characters 40, 41 designate the sprocket chains passing over sprocket wheels 25 on the driving or supporting wheels and the ratchet sprockets 26, 27 on the main driving shaft 24. In order to further brace the frame structure of the machine and to afford convenient means for supporting the elevators and ear carrying mechanism a large plate of irregular formation is secured to the main frame member 10 and extends downwardly in engagement with the draft frame 28. This plate is indicated by the reference character 43 and is of a width not quite equal to the space between the first and third rows over which the machine is designed to pass in operation. This makes it necessary to cut the plate with a slot extending approximately vertically at only one place near the center of it, in order to clear the middle row, since the first and third rows will pass the extremities of the plate whatever may be the adjustment of the first and third row gathering devices. Forward of the plate 43 is another plate 44 parallel to the first said plate and likewise provided with a vertical slot near the middle thereof, to permit the passage of the middle or second row of corn therethrough as the machine is passed over the field in the harvesting operation. The two parallel plates 43, 44, both of which are supported at the bottom by the frame 28, furnish a convenient means of supporting the corn carriers or elevators. These plates 43, 44 may also be utilized in supporting to an extent the center or second harvesting device, which is inserted within the approximately vertical slots in these plates heretofore referred to and extends rearwardly being secured to the frame 10 at the rear, but not adjustably secured thereto since obviously it will not be necessary to adjust the middle harvesting unit or device.

Having now described the general outline of the main frame of the machine, the driving mechanism and the elevator supporting frame, a description of the corn picking harvesting device will now be given. The present embodiment of the invention being a three-row machine, three of these ear picking devices or harvesting units will be required, the first and third of which will be adjustable in the manner already described. The general construction of the first and third of the harvesting units is the same, except that one of them is right and the other left. The middle unit because of its non-adjustability varies somewhat from the others in the details of construction of its supporting frame, although its mode of operation is the same.

In order to prevent duplication, the details of construction of the harvesting unit for the extreme right-hand row, or row #1 of the machine, as illustrated in the drawings, will now be given and it will necessitate that this description applies to the other harvesting units for rows two and three unless otherwise stated. The frame for supporting harvesting unit #1 has already been designated with reference character 14, the same being secured to the shaft 12 and from the main portion thereof the two branches, or bifurcations 14$^a$, 14$^b$ extend downwardly approximately parallel to pass on each side of the corn row and serve as a support for the rearward extremities of the row harvesting devices. The branches 14$^a$, 14$^b$ support frames which extend forwardly approximately parallel with each other on opposite sides of the row and are provided with pointed extremities as indicated at 14$^c$, 14$^d$. The corresponding branches of the harvester unit on the opposite side of the machine are designated by the reference characters 13$^a$ and 13$^b$. This frame is preferably constructed by extending a member forwardly and downwardly near the upper end of the parts 13$^a$, 14$^a$ as indicated at 13$^e$, 14$^e$ and extending other braces from near the bottom of the bifurcated frame members 13$^a$, 14$^a$ forwardly to unite with the part 13ᵉ, and a similar part not shown on the harvester unit on the opposite side of the machine, one of these bottom members being indicated by 13ᶠ on the drawings. The space between the frame members thus formed is preferably filled in by the use of thin sheet metal indicated by the reference character 13ᵍ, Fig. 3.

An important feature of the invention is the use of rollers indicated by the reference character 50. These rollers are rotatably journaled on the upper slanting surface of the gathering arms and extend from near the forward pointed projections of these gathering arms rearwardly and upwardly to a point immediately over the elevating carriers. These rollers, as well as the entire ear harvesting mechanism, are given a decided slant with the slotted part of the gathering arm on the upper side. The harvesting units are not all slanted alike, it will be observed from an inspection of the drawings. It is preferred, however, that two of these shall be slanted in the same direction and the third given an equal slant in the opposite direction, as illustrated in the drawings, which makes a more convenient arrangement, in order to secure compactness in the positioning of the machine and to enable a neat and effective arrangement of the ear elevating mechanism either for delivering the harvested ears to suitable husking mechanism or for collecting the ears and delivering them to the receptacle on the exterior of the machine.

The construction of the outer gathering arms 13ᵃ, 14ᵃ having been described, it is perhaps only necessary to add that these may be given additional means of support by extending a suitable brace 52 from the outer extremity of an extension on the shaft supporting the harvesting units, which in turn is supported by the main frame member 10 being given a certain amount of rigidity but movable with the harvesting units.

The gathering members supported by the branch 14ᵇ of the frame 14 which carries the idle stationary roll coöperating with the roll 50, already described, is supported by frame work somewhat similar to that already described for supporting roll 50. This latter roll is indicated by the reference character 53. This gathering member terminates, as before stated, in the point 14ᵈ shaped like the point 14ᶜ already referred to, for picking up the fallen corn and the idler roller 53 extends parallel with the roller 50 but lies in a different plane, on account of the general tilting of the entire gathering or picking mechanism. The idler roller 50 on the gathering arm already described is shown pivotally supported on the arm 13ᵉ by means of a suitable bearing member which is indicated by the reference character 55 and into which a gudgeon on the roller is journaled. The forward end of the roller 50 is preferably tapered somewhat near its forward extremity as indicated at 50ᵃ, and this forward extremity is provided with a gudgeon journaled in a suitable bearing formed in the pointed member 14ᶜ.

The general frame construction of the pivotal support of idler roller 53 on the opposite side of the harvesting device does not materially differ from the frame work already described, except that the triangular space between the members constituting the frame is not closed with sheet metal, but is provided with open spaces in order to gather the ears and allow them to fall through on to the conveying or elevating mechanism.

An important feature of the invention resides in the means employed in picking or removing the ears from the stalks, and the construction of this particular means will now be described. 56 (see Figs. 4 and 5) is a bracket pivotally supporting the rearward extremity of the roll 53, while 57 is a portion of the frame corresponding to the frame member 13ᵉ on the opposite gathering arm. 58 is the bottom frame member secured at the rear to the branch 13ᵇ of the main frame, and corresponding to the member 13ᶠ on the opposite divider. This construction without the sheet metal leaves a quadrangular opening which is bridged by a plurality of strips indicated by the reference characters 59, 60. These strips are spaced evenly from the portions of the frame 57, 58, and extend parallel therewith, so that the spaces between these various parallel members are about equal, to permit the ears to pass between and on to the elevating devices. The strips 59, 60 as well as the portions of the frame 57, 58 carry suitable knives adapted to remove or sever the ears from the stalks. These knives, of which there are preferably four, that is, one on each of the parallel bars referred to, are secured to these bars so as to extend somewhat above the upper edges thereof and to present slanting cutting surfaces to the ears to sever them from the stalks as the machine progresses along the row. These knives are designated in Fig. 4 by the reference characters 61 to 64 inclusive. Knives 63, 64 being the upper knives are shown with simply inclined edges extending from the upper edge of the bars to which they are secured rearwardly and upwardly at an approximately uniform slant. I prefer, however, to construct the lower knives 61, 62 somewhat differently, by providing them with forward portions which are indicated by the reference characters 61ᵃ, 62ᵃ, which forward portions present an abruptly slanting cutting portion to the ears and then a considerable depression in the effective cutting edge of the knife to allow the knife to gradually operate upon any uncut ears to sever them as the machine progresses farther along. The cutting portions 61ª, 62ª are provided for the purpose of doing the major portion of the work of severing the ears, since most of the ears will be presented to these two lower knives and will be severed promptly upon presentation thereto. Since these cutting knives are upon the undermost side of the inclined gathering arms it will be obvious that the weight of the ears as the stalks are presented to the machine will tend by gravity to fall through the slots between the bars carrying the knives 61 to 64 inclusive, but in order to compel the ears to be pressed through between these knife carrying bars and come in contact with the knives, to be severed, the outside divider, as described, is made of solid sheet metal and the space between the dividers is made barely wider than the thickness of the stalks themselves, which tends to force the ears between the said bars adjacent the cutting knives by the pressure of the sheet metal divider.

The foregoing description is believed to be sufficient as applied to the first and third ear picking or harvesting units, and the middle unit does not differ in its essential construction in any important principles, with the single exception that it is non-adjustable in relation to the main frame. The parts of the middle unit which correspond in their essential features of construction to the first and third units are shown in section in Fig. 5 and designated by reference characters 57ª to 64ª inclusive.

An important feature of the invention is the provision made for taking care of the ears after being severed and insuring that they shall be promptly and effectively presented to the elevating devices to be conveyed to the wagon or other carriage.

Reference has already been made to the rear stationary strengthening plate 43 and to the forward plate 44. These plates are connected by suitable bottom plates of sheet metal 67, 68, which extend adjacent the picking mechanism just described, and the knives 61 to 64 thereon, so that when the harvesting units are adjusted for extremely narrow rows and the outer units are close to each other, the ears being thrown between the picker bars will fall upon the sheet metal bottoms 67, 68. To provide against any space intervening and the consequent loss of ears between the picker bars and the receiving metal bottoms on the main frame, metal aprons as indicated at 72 Fig. 5, are attached to the frame carrying the picker bars, and these telescope over the edges of the bottoms 67, 68, which receive the picked ears. These aprons are of sufficiently thin metal to be flexible, or better still, are pivotally connected to the frame carrying the picker bars, which last permits of adjustment and still insures that the receiving bottom for the picked ears will remain intact and not permit the loss of any of the harvested corn, regardless of the adjustment. The same principle is also applied to prevent the loss of corn between the rear plate 43 and the harvester units, and this is accomplished by securing aprons of suitable metal or other material to the branches of the adjustably supported frames 13, 14, which aprons are designated by the reference characters 70, 71, and are of sufficient width to pass beyond the outer extremity of plate 43, so that whatever adjustment of the outside picker units may be employed the back plate will form a closure to prevent the loss of any harvested corn therethrough.

The construction of the elevating mechanism of my machine will now be described. From the foregoing description it will be seen that as the picker bars and the knives thereon sever and free the ears from the stalks of standing corn the ears will be directed upon the metal bottoms 67, 68 of the machine. By referring to Fig. 5, it will be seen that the arrangement of the harvesting units is such that the mechanism for picking one of the rows, which mechanism is supported by the adjustable frame 13, will discharge the picked ears from that row upon the sheet metal bottom 68, because of the incline of this harvester unit over the metal bottom 68. In the same view it will be seen that the picker mechanism for harvesting the middle row is likewise inclined over this same metal bottom. This makes it possible for me to elevate the harvested corn from two of the rows by a single carrier mechanism. This carrier mechanism is shown in detail in Figs. 4 and 5, from which it will be seen that it consists of a suitable flexible endless carrier 75, carried by suitable sprocket wheels 76, 77. These sprocket wheels 76, 77 are carried by shafts 78, 79, rotatably supported by the rearward and forward plates 43, 44 respectively. The endless carrier 75, preferably consists of two or more endless chains or belts with suitable connecting members indicated by the reference character 80, and carrying suitable teeth or caps indicated by reference character 81, adapted to engage the ears and elevate them when the endless carrier is moved, the ears being discharged from the top of the elevator into a suitable trough 83 at the bottom of which another endless carrier, which is generally indicated by the reference character 84, conveys the ears along an adjustable conveyer and delivers them into some suitable receptacle, as, for example, the wagon box, as shown in this embodiment of the invention. It will be seen that the sheet metal bottom adjacent the bottom of the carrier 75 is depressed so that the ears of corn upon being discharged therein will tend to fall to the bottom of the depression by gravity. This will enable the elevating means of the carrier to engage the ears, regardless of the side to which they fall and to deliver them into the carrying trough 83.

Before referring to the means for driving the elevator and carrier a description of the details of the carrier will be given. The carrier trough 83 is fixed in relation to the main frame of the machine and extends forwardly some distance over the elevators and is supported by an upright brace 86, which is attached to the main frame of the machine at some convenient point, and at 87 an extension conveyer 88 is hinged to the stationary conveyer section 83, said latter conveyer section extending forwardly over the top of wagon box, as illustrated in Figs. 6 and 7 in particular. The length of this hinged section is adapted to cover the longitudinal length of the wagon box. Like the conveyer section 83, the hinged conveyer section 88 is trough shaped, it being simply a movable continuation of the conveyer 83, and contains an important feature of the invention, namely, a plurality of openings indicated by the character 89. Closures are provided for these openings 89, as indicated by the reference character 90, there being one of such closures for each of the door openings. The closure members 90 are slidably mounted so that they may be operated to close the openings 89, or may be operated to allow the corn as it is conveyed along the trough 88 to drop through the openings 89 into the wagon box. In order that the conveyer may be completely under the control of the operator the movable doors 90 are preferably operated from the forward end of the wagon near the driver's seat, and this may be accomplished by suitable rods, as indicated at 91, there being one of such rods for each of the doors 90. These rods are slidably mounted in brackets on the conveyer 88 said brackets being designated by the reference characters 88ª, 88ᵇ, and have operating handles, as indicated, extending within convenient reach of the driver's seat, and by operating these handles which are indicated generally by the reference character 92, the operator may control the position at which the corn will be discharged from the carrier 88. The forward extremity of the carrier 88 is provided with a cross bar 93, which has downwardly extending projections 94, forked at their lower extremities, as indicated at 95, the branches of which extend on the opposite sides of the wagon box. In this manner the weight of the forward end of the carrier 88 may be borne by the sides of the wagon box and the carrier be free to slide longitudinally of the box, since it is shown that the carrier shall not be rigidly secured to the wagon box, because it would be broken in case the machine should suddenly become disconnected from the wagon. In order to have the corn conveyed along the stationary section of the conveyer 83 and the movable section 88 an endless conveyer belt is provided. This belt is indicated by the reference character 97, and it is provided with a plurality of spaces vertically, and laterally extending projections 98, which engage the ears of corn and cause them to travel with the belt along the trough or conveyer. This endless conveyer belt is driven by a sprocket wheel 100 secured to a countershaft 101 on some suitable part of the main frame of the machine, as the plate 43. The shaft 101 carries another sprocket wheel 102, with which a sprocket chain 103 coöperates to drive over the main driving shaft 24. The bottom of the stationary delivery chute 83 supports the conveyer belt 97 and at a point near the joining of the hinged section 88 of the conveyer an idler sprocket 104 also supports the conveyer belt. At the forward extremity or discharge end of the hinged conveyer section 88 is another sprocket 104 around which the belt passes while the lower or idler run of the belt is supported by the idler sprocket 105.

The manner in which movement is imparted to the main driving shaft 24 from the driving wheels 20, 21 has been described and likewise the construction of the mechanism for imparting movement to the conveyer belt has just been referred to. Mention has been made of the elevating belts 75 adjacent each of the end picker units, and it should be noticed that these elevator belts 75 are driven by power applied to shafts 79 carrying driving sprockets 76 supporting these elevator belts at the upper ends of their runs, while the sprockets 77 at their lowest extremities are idlers. The main driving shaft 24 has secured thereto bevel gears 110 in mesh with bevel gears 111 on the shafts 79, through which the necessary movement of these parts is given.

Having described the principal features of construction of the preferred embodiment of my invention I will now describe its mode of operation. The machine in the preferred form herein described is particularly adapted to be attached to the rear end of farm wagons as shown. Since the forward extremities of the hinged conveyer section 88 is supported on the sides of the wagon box by the means described, it will be seen that when the wagon box is detached from the machine there must be some means to hold the movable conveyer section from dropping to the ground. This I provide in the braces 113 secured to the uprights 86 extending forward of the hinge 87 securing the movable section of the conveyer 88 to the fixed section 83. The brace 113 is normally not effective to support the movable section of the conveyer when the same is in position on the wagon box, but when the wagon box is withdrawn the movable section of the conveyer will drop sufficiently low to engage the forward extremity of these braces which will prevent the movable section from falling to the ground.

The machine is operated by attaching it to the rear axle, or hound or reach of a wagon, and at the same time supporting the movable section of the conveyer above the box or bed of the wagon in the manner illustrated. The wagon is then driven through the field in such a manner that the rows of corn will pass between the divider points of the three harvester units. The rolls 50, 53 will cause the stalks of corn to be straightened but as the rolls turn easily with very little friction, there will be no tendency to break the ears from the stalks, particularly since the spaces between the rolls permit of the ears passing easily between them. When the stalks of corn with the ears thereon have passed beyond the rolls on account of the inclined position of the dividers gravity will cause the ears to swing against the open divider side which has the parallel bars carrying the stationary ear severing knives 61 to 64 inclusive. As the ears by gravity fall between the spaces of these bars the knives referred to will operate to detach them from the stalks, and their entry between these knife plates will be expedited by reason of the fact that the upper divider side 13$^g$ of sheet metal may tend to crowd the ears into engagement with the severing knives 61 to 64 inclusive, by reason of the limited space between the divider sides. The ears thus being freed from the stalks the latter will be permitted to pass through the openings described in the plate 43 as the machine progresses. The ears, however, will be directed upon the bottom members 67, 68 adjacent the ear elevators and will thence be carried and delivered first to the fixed carrier section 83 and later to the movable carrier section 88, and hence deposited in the wagon box 38, through the openings 89 in the conveyer under the control of the operator or driver.

It will thus be seen that my improved corn harvesting machine is of such a simple character that it will require no operator except the driver of the wagon, and that when the wagon box has been filled the operator may disconnect the corn harvesting machine therefrom and allow it to rest in the field while he delivers his load of corn to the crib, or another operator may use the machine while he is unloading.

My improved corn harvester has relatively few parts, is not liable to get out of order, and particularly because of the improved means used for severing the ears of corn from the stalks it may be operated with a very small expenditure for power. Heretofore many corn harvesters utilizing rolls or rollers for snapping the ears from the stalks have required so much draft power as to make them practically prohibitive, particularly on account of the treacherous and uncertain condition of the corn ground at the usual time of corn harvesting, which makes it difficult to secure the necessary traction to operate snapping rolls, which roll the stalks of corn between them and break off the ears, by reason of the close proximity of the rolls.

My improved corn harvesting machine is also adapted to be used in connection with husking rolls of ordinary shape, which may be built into the machine and operated by the draft power of the machine, or by separate motor power, as a gas or gasoline engine mounted on the main frame. In this case, of course, the corn husking and cleaning mechanism would be mounted between the endless elevating mechanism 75, and the delivery end of the movable conveyer 88, in order that nothing but completely husked and clean corn might reach the wagon box.

In order that the invention may be fully understood the details of the preferred embodiment thereof have been thus specifically described, but it is not desired to be limited to the exact details, because it will be apparent that persons skilled in this art may make many modifications without departing from the purpose and scope of the invention.

What I claim is:

1. In a corn harvesting machine, the combination with divider arms being spaced apart to form a passage for the stalks and having approximately parallel upwardly and rearwardly inclined forward edges, idler rollers extending along said inclined edges approximately parallel to each other and a plurality of approximately parallel stationary ear severing knives located at the rear of said rollers.

2. In a corn harvesting machine, the combination with divider arms having approximately upwardly and rearwardly inclined forward edges, idler rollers extending along said inclined edges approximately parallel to each other being spaced apart to form a passage for the stalks, said idler rollers being separated a sufficient distance so that they do not act as husking rollers, and ear severing devices located at the rear of said idler rollers in the path of the corn passing between said idler rollers.

3. In a corn harvesting machine, the combination with a main frame comprising a supporting bar extending transversely the entire width of the machine, an inverted U-shaped frame provided with axles for the carrying wheels at the lower extremities thereof, means for attaching the said U-shaped axle member to the said supporting member, a plurality of relatively adjustable ear gathering mechanisms mounted on the main frame, means for elevating and delivering the ears from the said ear gathering mechanisms, and means for driving the said elevating and delivering means from the supporting wheels of the machine.

4. In a corn harvesting machine, the combination with divider arms being spaced apart to form a passage for the stalks and having approximately parallel upwardly and rearwardly inclined forward edges, idler rollers extending along said inclined edges approximately parallel to each other, and ear severing devices located at the rear of said rollers.

5. In a corn harvesting machine, the combination with divider arms having upwardly and rearwardly inclined forward edges, of a plurality of stationary ear severing knives spaced apart and arranged in vertical alinement to engage the ears of corn along an extended length of each of the stalks and being located at the rear of the divider arms and in the path of the corn passing therebetween.

6. In a corn harvesting machine, the combination with divider arms adapted to pass on either side of a row of corn for guiding the stalks of corn therebetween, and an ear gathering device positioned adjacent to said gathering arms and in the path of the corn passing therebetween, said ear gathering device comprising a plurality of bars spaced apart and extending longitudinally of the corn row, there being fixed angularly-extending knives or ear severing devices secured to said parallel bars and extending into the spaces therebetween.

7. In a corn harvesting machine, the combination with divider arms spaced apart and having approximately parallel upwardly and rearwardly inclined forward edges, idler rollers extending along said inclined edges approximately parallel to each other, a plurality of approximately parallel bars spaced apart and extending longitudinally of the direction of movement of the machine in the path of the row of corn adapted to pass between said divider arms, and ear severing devices secured to said approximately parallel bars and extending into the spaces therebetween.

8. In a corn harvesting machine, the combination with divider arms having approximately parallel upwardly and rearwardly inclined forward edges for guiding a row of corn to the machine, idler rollers extending along said inclined edges approximately parallel to each other, a plurality of approximately parallel stationary ear severing knives located at the rear of said rollers, and means for elevating and delivering the ears of corn from said ear severing knives to a wagon box or other suitable receptacle.

9. In a corn harvesting machine, the combination with a main supporting frame, of a plurality of ear gathering mechanisms secured to the main frame, said ear gathering mechanisms comprising divider arms having approximately upwardly and rearwardly inclined forward edges, a plurality of spaced bars extending longitudinally of the direction in which the machine is adapted to be drawn along a corn row, and ear severing knives secured to said parallel bars and extending into the spaces therebetween.

10. In a corn harvesting machine, the combination with a main supporting frame, of a platform on said frame, a plurality of ear gathering mechanisms mounted on the main frame adjacent said platform, one of said ear gathering mechanisms being adjustably mounted in relation to the other and in relation to said platform, said ear gathering mechanisms comprising each separated divider arms and rearwardly extending portions from the divider arms spaced apart to provide means for the passage of rows of corn therebetween, ear severing knives secured to the said ear gathering mechanisms at the rear of the divider arms, each of said ear gathering mechanisms and the divider arms being inclined upwardly toward each other so as to overhang the platform, and elevating and conveying mechanism for delivering the corn from said platform to the exterior of the machine.

11. In a corn harvesting machine, the combination with divider arms spaced apart to permit the passage therebetween of a standing row of corn, said divider arms being upwardly and rearwardly inclined, ear severing mechanism secured to said divider arms at the rear thereof and in the path of the incoming corn, said ear severing devices comprising a plurality of bars spaced apart and extending longitudinally of the direction of the travel of the corn between said dividers, and ear severing devices secured to the said bars and extending into the spaces therebetween and adapted to sever ears of corn presented to said knives by the gravity of the ears, the said space bars and the ear severing knives thereon being located on the under side of the inclined dividers or on the side toward which the said dividers are inclined.

12. In a corn harvesting machine, the combination with a main frame, of a platform supported by the main frame, a plurality of ear gathering mechanisms supported by the main frame adjacent to the said platform and coöperating therewith to deliver corn thereto, one of said ear gathering mechanisms being adjustably mounted in relation to the main frame, and an apron pivotally secured to the said adjustable mechanism and being adapted to coöperate with the platform during the adjustment of the ear gathering mechanism to insure the delivery of the gathered ears to the platform.

13. In a corn harvesting machine, the combination with a main frame, comprising a U-shaped member provided with axles for carrying wheels at the extremities of the branches of the frame, a rigid member extending from side to side of the machine and secured to the upper extremity of the U-shaped frame, a plurality of ear gathering mechanisms slidably mounted on the rigid member of the main frame, and means for adjustably securing the ear gathering mechanisms to the rigid member of the frame.

In testimony whereof I have signed my name to this specification, in the presence of two subscribing witnesses, on this 3rd day of July, A. D. 1912.

DARIUS T. PHILLIPS.

Witnesses:
A. L. SPRINKLE,
CHARLES H. SEEM.

Copies of this patent may be obtained for five cents each, by addressing the "Commissioner of Patents, Washington, D. C."